United States Patent
Roy et al.

(10) Patent No.: US 11,436,509 B2
(45) Date of Patent: Sep. 6, 2022

(54) ADAPTIVE LEARNING SYSTEM FOR INFORMATION INFRASTRUCTURE

(71) Applicant: EMC IP Holding Company LLC, Hopkinton, MA (US)

(72) Inventors: Mainak Roy, Bangalore (IN); Chitrak Gupta, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1172 days.

(21) Appl. No.: 15/959,775

(22) Filed: Apr. 23, 2018

(65) Prior Publication Data
US 2019/0325330 A1    Oct. 24, 2019

(51) Int. Cl.
| G06F 40/00 | (2020.01) |
| G06N 5/04 | (2006.01) |
| H04L 67/50 | (2022.01) |
| G06N 20/00 | (2019.01) |
| G06F 16/951 | (2019.01) |
| G06F 16/958 | (2019.01) |

(Continued)

(52) U.S. Cl.
CPC .......... *G06N 5/047* (2013.01); *G06F 16/951* (2019.01); *G06F 16/958* (2019.01); *G06F 40/131* (2020.01); *G06F 40/137* (2020.01); *G06F 40/242* (2020.01); *G06F 40/258* (2020.01); *G06F 40/279* (2020.01); *G06F 40/284* (2020.01); *G06F 40/289* (2020.01); *G06N 5/025* (2013.01); *G06N 5/04* (2013.01); *G06N 20/00* (2019.01); *H04L 67/22* (2013.01)

(58) Field of Classification Search
CPC ....... G06F 16/958; G06F 16/951; H04L 67/22
See application file for complete search history.

(56) References Cited

U.S. PATENT DOCUMENTS

| 7,085,682 B1 * | 8/2006 | Heller | G06Q 30/02 |
| | | | 702/186 |
| 8,494,897 B1 * | 7/2013 | Dawson | G06Q 10/10 |
| | | | 705/7.33 |

(Continued)

OTHER PUBLICATIONS

Linear Regression from Wikipedia (retrieved at https://web.archive.org/web/20180421225347/https://en.wikipedia.org/wiki/Linear_regression, 17 pages, archived Apr. 21, 2018). (Year: 2018).*

(Continued)

*Primary Examiner* — Scott T Baderman
*Assistant Examiner* — Barbara M Level
(74) *Attorney, Agent, or Firm* — Ryan, Mason & Lewis, LLP

(57) ABSTRACT

A method in one embodiment comprises monitoring interaction of a plurality of users with at least one website, extracting and analyzing data from the monitoring, wherein the data corresponds to interaction of the plurality of users with the at least one website, deriving one or more patterns of the plurality of users based on the analyzing, generating one or more rules regarding how content from the at least one website is at least one of sought, accessed and used, generating and transmitting to at least one organizational user device one or more recommendations for modifying how the content is at least one of organized and presented in connection with the at least one website, and executing at least one of reorganization and re-presentation of the content in connection with the at least one website.

20 Claims, 6 Drawing Sheets

(51) Int. Cl.
*G06F 40/242* (2020.01)
*G06F 40/289* (2020.01)
*G06N 5/02* (2006.01)
*G06F 40/137* (2020.01)
*G06F 40/279* (2020.01)
*G06F 40/131* (2020.01)
*G06F 40/258* (2020.01)
*G06F 40/284* (2020.01)

(56) References Cited

U.S. PATENT DOCUMENTS

| | | | | |
|---|---|---|---|---|
| 10,366,401 | B1* | 7/2019 | Pearcy | G06Q 30/02 |
| 2002/0152237 | A1* | 10/2002 | Cohen | G06F 3/14 |
| | | | | 715/205 |
| 2006/0136387 | A1* | 6/2006 | Yalovsky | G06F 16/345 |
| 2011/0270820 | A1* | 11/2011 | Agarwal | G06F 40/253 |
| | | | | 707/709 |
| 2013/0021345 | A1* | 1/2013 | Hsiao | G06F 3/0484 |
| | | | | 345/440.2 |
| 2013/0138503 | A1* | 5/2013 | Brown | G06Q 30/0203 |
| | | | | 705/14.45 |
| 2013/0159298 | A1* | 6/2013 | Mason | G06F 16/9535 |
| | | | | 707/728 |
| 2014/0075336 | A1* | 3/2014 | Curtis | G06F 3/0481 |
| | | | | 715/753 |
| 2015/0039416 | A1* | 2/2015 | Sullivan | G06Q 30/0276 |
| | | | | 705/14.43 |
| 2016/0080485 | A1* | 3/2016 | Hamedi | G06Q 30/0242 |
| | | | | 709/204 |
| 2017/0063653 | A1* | 3/2017 | Kieviet | H04L 43/00 |
| 2017/0329747 | A1* | 11/2017 | Noursalehi | G06N 7/005 |

OTHER PUBLICATIONS

Kernel Density Estimation from Wikipedia (retrieved at https://web.archive.org/web/20170720073754/https://en.wikipedia.org/wiki/Kernel_density_estimation, 8 pages, archived Jul. 20, 2017). (Year: 2017).* pythonhosted.org, "Kernel Density Estimation Tutorial," https://pythonhosted.org/PyQt-Fit/KDE_tut.html, 2013, 11 pages.

Wikipedia, "Probability Density Function," http://en.wikipedia.org/wiki/Probability_density_function, Apr. 13, 2018, 8 pages.

* cited by examiner

ADAPTIVE LEARNING SYSTEM FOR INFORMATION INFRASTRUCTURE

FIELD

The field relates generally to information processing systems, and more particularly to the development of a learning system for an information infrastructure which improves conversion rate optimization (CRO).

BACKGROUND

Information is ubiquitous and there is a need for technology to enhance information availability so that the information is comprehensible and consumable by customers. Many users have a need and/or desire for information to be available from anywhere and at any time using any computer-based device. Organizations currently have and provide users with multiple computer products (e.g., applications) that provide enhanced access to information. However, instead of using the available products, users continue to directly contact the organizations for requested information, as the available products do not address the difficulties for users to navigate through the universe of available information and products and to accurately determine which data they require.

Search engine optimization (SEO) corresponds to the systems, processes and/or techniques used for increasing a website's or webpage's visibility/ranking in search results provided by a search engine, such as an online search engine, like Google®, Yahoo®, Bing®, etc. Conversion optimization, or conversion rate optimization (CRO) refers to the systems, processes and/or techniques used for increasing the percentage of visitors to a website or webpage that become customers of the affiliated organization, and/or take a desired action that is prompted by the website or webpage.

Often, although an organization's SEO score improves, CRO may be poor. For example, in connection with the provision of technical information and support for its products (e.g., software products and platforms), an organization may provide a website which hosts technical documents and scripts. Although an SEO score in connection with the website may be relatively high, the organization may still receive multiple queries through forums, emails and calls concerning user difficulties with the website, including, for example, searching the data and finding the desired technical documents and/or scripts.

Accordingly, there is a need for improved information processing systems that improve CRO.

SUMMARY

In one embodiment, an apparatus comprises at least one processing platform including a plurality of processing devices. The processing platform is configured to monitor interaction of a plurality of users with at least one website, to extract and analyze data from the monitoring, wherein the data corresponds to the interaction of the plurality of users with the at least one website, to derive one or more patterns of the plurality of users based on the analyzing, to generate one or more rules regarding how content from the at least one website is at least one of sought, accessed and used, to generate and transmit to at least one organizational user device one or more recommendations for modifying how the content is at least one of organized and presented in connection with the at least one website, and to execute at least one of reorganization and re-presentation of the content in connection with the at least one website. At least one of the deriving, the generation of the one or more rules and the generation of the one or more recommendations is performed by invoking one or more machine learning algorithms using the data.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Examples of public clouds may include, but are not limited to, Amazon Web Services® (AWS), Google Compute Engine® (GCE), and Windows Azure® Services platforms. Thus, enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

Figure 1:
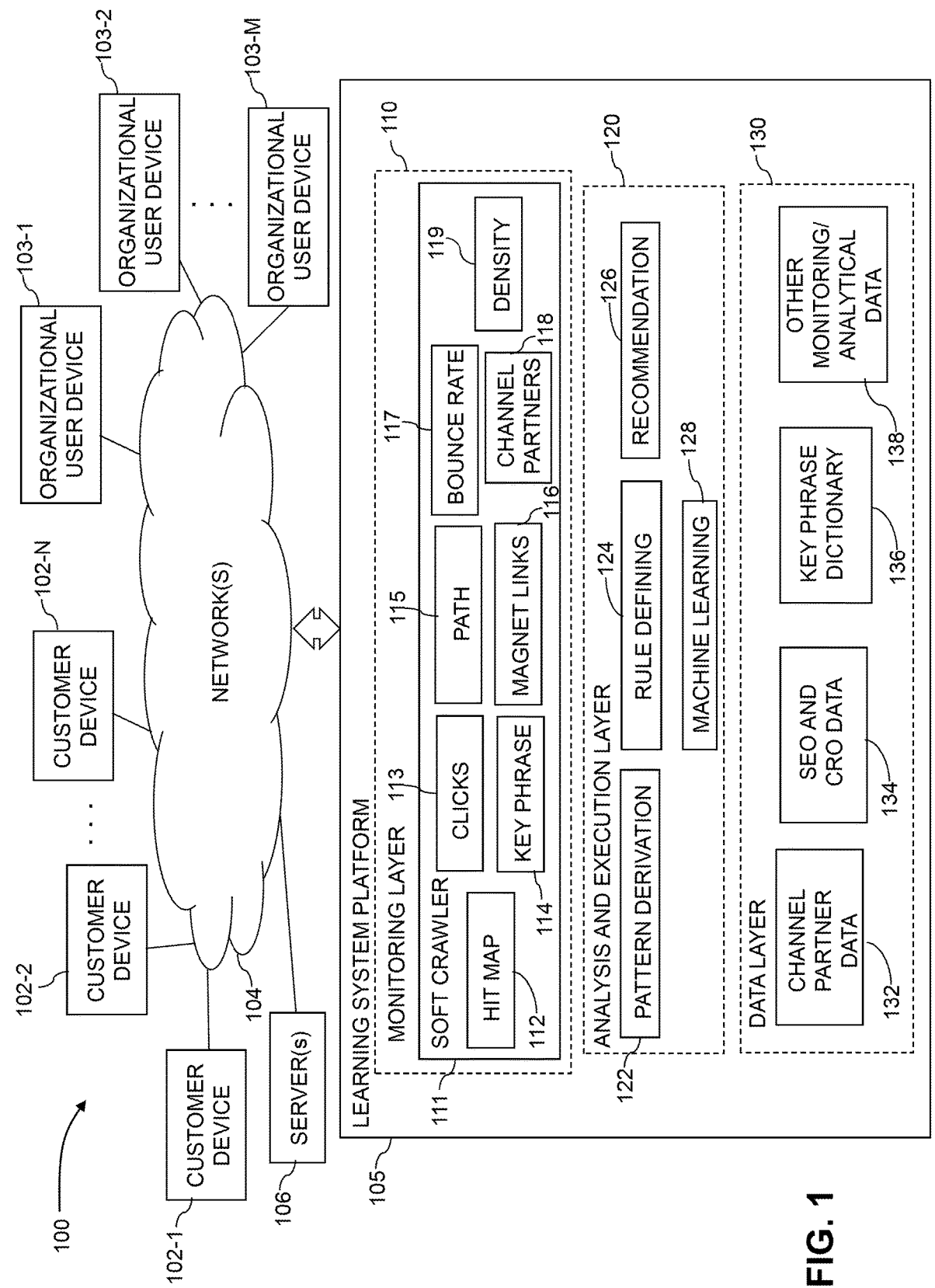
FIG. 1 is a block diagram of an information processing system comprising a learning system platform configured for improving conversion rate optimization (CRO) in an illustrative embodiment.

FIG. 1 shows an information processing system 100 configured in accordance with an illustrative embodiment. The information processing system 100 comprises customer devices 102-1, 102-2, . . . 102-N (collectively "customer devices 102"), and organizational user devices 103-1, 103-2, . . . 103-M (collectively "organizational user devices 103"). The customer devices 102 and organizational user devices 103 communicate over a network 104 with a learning system platform 105.

The customer and organizational user devices 102 and 103 can comprise, for example, desktop, laptop or tablet computers, mobile telephones, or other types of processing devices capable of communicating with the learning system platform 105 over the network 104. The variables N, M and other similar index variables herein such as K and L are assumed to be arbitrary positive integers greater than or equal to two.

The term "customer" or "user" herein is intended to be broadly construed so as to encompass numerous arrangements of human, hardware, software or firmware entities, as well as combinations of such entities. Learning system services are assumed to be provided for customers and/or organizational users one or more machine learning models, although it is to be appreciated that other types of infrastructure arrangements could be used. At least a portion of the available learning system and machine learning services in some embodiments may be provided under Function-as-a-Service ("FaaS") and/or Platform-as-a-Service (PaaS) models, including cloud-based FaaS and PaaS environments.

The learning system platform 105 in the present embodiment is assumed to implement at least a portion of a machine learning environment accessible to the customer and/or organizational user devices 102 and 103 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using IP or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The learning system platform 105, on behalf of respective infrastructure tenants each corresponding to one or more customers and/or organizational users associated with respective ones of the customer and/or user devices 102 and 103, implements automated learning system services to continuously learn and relearn behavior patterns that can change based on users' interactions with information on one or more websites. According to an embodiment, the infrastructure tenants are cloud infrastructure tenants. By way of example, the learning system services are assumed to include execution and training of one or more machine learning applications on behalf of each of one or more customers and/or organizational users associated with respective customer and organizational user devices 102 and 103, wherein the machine learning applications use key word and/or key phrase occurrences in connection with seeking content on one or more websites, SEO and CRO scores for the one or more websites, and key words and/or key phrases contributing to SEO and CRO scores.

The learning system platform 105 in some embodiments may be implemented as part of cloud infrastructure in the form of a cloud-based system such as an AWS system. Other examples of cloud-based systems that can be used to provide at least portions of the learning system platform 105 and possibly other portions of system 100 include GCE, Windows Azure®, and Domino Data Science Platform.

In accordance with an embodiment of the present invention, the learning system platform 105 implements a usage pattern learning system. Users (e.g., customers) may electronically search for, access and use information from an organization in a variety of ways. The behavior of respective customers in connection with electronically searching for, accessing and using information is different and can vary based on, for example, individual preferences, devices being used, and/or reasons for needing the information. Assuming that the information is constant, the embodiments of the present invention recognize an "n×1" approach, where n=different ways that users/customers are searching for, accessing and/or using information and 1=the information being sought, accessed and/or used.

As n is not constant, the learning system platform 105 executes one or more algorithms that can learn and re-learn the users' behavior patterns over a period of time, while keeping the information constant. The learning system platform 105 continuously executes the one or more algorithms, which, for example, analyze multiple CRO factors (as described further herein) for each user action in connection with searching for, accessing and/or using the information.

In accordance with an embodiment of the present invention, the learning system platform 105 periodically generates a guidance model for existing content including one or more recommendations for improving the presentation of the content and provides an analysis of how the existing content is performing (e.g., CRO score) based on the CRO factors. The learning system platform 105 further generates a predictive guidance model for future (e.g., reorganized and/or re-represented) content based on the one or more recommendations and provides an analysis of how the future content will yield improved CRO based on the CRO factors.

The learning system platform 105 in the embodiment of FIG. 1 illustratively comprises a monitoring layer 110, an analysis and execution layer 120 and a data layer 130. The monitoring layer 110 comprises a soft crawler component 111, which monitors different contributing CRO factors and includes, but is not is not necessarily limited to, hit map, clicks, key phrase/key word, path, magnet links, bounce rate, channel partners and density modules 112, 113, 114, 115, 116, 117, 118 and 119. The hit map module 112 monitors and generates hit maps for websites in order to identify the amount of attention that portions of a website are receiving from website visitors. A hit map identifies volume of traffic to different portions of a website based on, for example, number of visits to linked websites or webpages of a website. The clicks module 113 monitors and records the source of user clicks (e.g., activation of hyperlinks caused by, for example, mouse clicks, finger clicks on a touchscreen, typed-in URLs, etc.) for every interaction with a website, which provides data corresponding to search convenience for users seeking information from the website and search engines that have indexed the website content. The clicks module 113 also monitors and records out going clicks made by users seeking specific content on a website, and whether the outgoing clicks lead to the sought after content. For example, the clicks module 113 records the amount of time users spend on content after clicking to access the content, where spending less time on a webpage or website with the content may indicate that the click led to irrelevant or incorrect content.

The key phrase/key word module 114 monitors and records key phrases and/or key words that have been used by users in connection with seeking the content. For example, key phrases and/or key words may be used in a search engine by users seeking certain information, and the key phrase/key word module 114 automatically identifies key phrases and/or key words used by users to find the content, identifies the frequency with which the key words and/or phrases may be used, links the key words and/or phrases to corresponding search results, identifies different combinations of key words and/or phrases that may be used when seeking the same content, and monitors whether the used key words and/or phrases yield the sought after content and/or websites.

The path module 115 monitors and records the electronic path a user follows in order to retrieve content from a website. For example, the path may include a source click followed by navigation in a web page, followed by an out-going link to the content. Knowledge and analysis of user paths to content can assist content owners (e.g., organizations) with understanding desired workflow from users' points of view. Corrections or modifications to the workflow based on knowledge and analysis of user paths can increase CRO.

CRO score may depend heavily on effective key phrases and/or key words that lead to desired content. An effective key phrase and/or key word may act like a magnet to the desired content. The magnet links module 116 monitors hyperlinks associated with high-valued (e.g., effective) key phrases and/or key words (referred to as "magnet links"), captures the magnet links and validates the magnet links against organizational information to understand if the magnet links are relevant to the business.

As used herein, "bounce rate" refers to the percentage of visitors to a website who navigate away from the website after viewing only one page. The bounce rate module 117 monitors and records bounce rate for a plurality of websites, i.e., the percentage of a plurality of users who navigate away from the websites after viewing one webpage.

The channel partners module 118 monitors and records how channel partners (e.g., companies that partner with an organization to market and sell the organization products and/or services) are performing on the same set of information. For example, the channel partners module 118 automatically collects data in connection with a variety of CRO factors (e.g., hit maps, clicks, key phrases/key words, path, magnet links, bounce rate, density) regarding whether channel partner websites successfully retrieve sought after content. Channel partners can have co-branding relationships with organizations.

The density module 119 periodically searches for and records information density at generic websites, and searches for and records magnet links for business units which are the same or similar to an organization's business units. Magnet links are links that include more relevant meta information about online products and create more customer interest than other links. In other words, magnet links are links that generate high levels of customer interest without being, for example, promotional or paid advertisements. A particular product may have different magnet links which are active on search results based on the nature of customer interaction.

Once magnets are identified for a specific online product, the system attempts to replicate the same meta information in the corresponding URLs of other related online products to create increased customer interest for the related online products.

The learning system platform 105 includes an analysis and execution layer 120 with, for example, a pattern derivation engine 122, a rule defining engine 124, a recommendation engine 126 and a machine learning engine 128. The pattern derivation engine 122 derives one or more patterns of a plurality of users in connection with interaction of the plurality of users with the one or more websites. The patterns are derived based on analyzing data from the monitoring and data layers 110 and 130. Patterns may also be derived based on usage information in server caches. In accordance with an embodiment of the present invention, the machine learning engine 128 performs the derivation by invoking one or more machine learning algorithms using the data. Algorithms running in the soft crawler component 111 gather results in connection with a variety of CRO factors, including but not necessarily limited to, hit maps for the one or more websites, click counts corresponding to respective portions of the content, search engines that have indexed the content, navigation paths of a plurality of users in connection with seeking, accessing and/or using the content, key words and/or key phrases used by the plurality of users in connection with seeking the content, channel partner performance, bounce rate and/or density. The pattern derivation engine 122 derives the user patterns and the rule defining engine 124 defines rules on how this information is getting consumed. More specifically, based on the user pattern data from the pattern derivation engine 122, the rule defining engine 124 generates one or more rules regarding how content from one or more websites is sought, accessed and/or used.

Based on data from the pattern derivation, rule defining, and machine learning engines 122, 124 and 128, the recommendation engine 126 generates and transmits to at least one organizational user device 103, one or more recommendations for modifying how the content is organized and/or presented in connection with the one or more websites. The recommendations may include a mapping strategy for the content to generate maximum CRO. The recommendation engine 126 manages recommendations and alerts from the recommendation engine 126 over the network(s) 104 to the appropriate parties via organizational user devices 103-1 to 103-M. Appropriate parties may include, for example, enterprise personnel or other members of or associated with an organization who are involved in content management.

Based on the recommendations, the learning system platform 105 can execute reorganization and/or re-presentation of the content in connection with the one or more websites. Such reorganization and/or re-presentation can include, for example, adding one or more key words and/or key phrases used by a plurality of users in connection with seeking the content to one or more content headings and re-indexing the content. In order to execute reorganization and/or re-presentation of the content, and perform the monitoring and retrieval of CRO data, the learning system platform 105 can communicate over the network(s) 104 with one or more servers 106 responsible for organizing the content and providing the content to the customer devices 102.

In connection with the reorganization and/or re-presentation of the content, the learning system platform 105 can be configured to automatically execute the reorganization and/or re-presentation of the content based on recommendations received from the recommendation engine 126. Alternatively, as noted above, the recommendations are transmitted to organizational personnel responsible for content management. The personnel can evaluate the recommendations, make decisions on which recommendations to implement, and prompt the learning system platform 105 to implement some or all of the recommended reorganizations and/or re-presentations of the content.

The machine learning engine 128 applies machine learning techniques to data from the monitoring layer 110 and the data attributes 132, 134, 136 and 138 from the data layer 130 in order to develop models based on existing content and predictive models based on reorganized and/or re-presented content. The data attributes are not necessarily limited to the illustrated data attributes 132, 134, 136 and 138 and may include additional or alternative data attributes. The machine learning engine 128 applies one or more algorithms to measure SEO adherence of content, and recommend possible mapping strategies to amplify the content and generate maximum CRO. In accordance with an embodiment of the present invention, the pattern derivation, rule defining and recommendation engines 122, 124 and 126 are configured to utilize the machine learning engine 128 and machine learning techniques to identify user behavior patterns, rules on how information is getting consumed and recommendations for modifying how the content is organized and/or presented in connection with the one or more websites.

In more detail, the machine learning engine 128 advantageously uses a unique combination of machine learning algorithms and a set of data attributes to automatically perform data discovery, which includes execution of an analysis of the various possibilities and sources for similar types of data and how that data is being treated or compared against an organization's own data. Such analysis is beyond conventional SEO techniques. The machine learning engine 128 analyzes CRO in connection with a variety of factors across different websites, and determines the dynamics that increase CRO.

According to an embodiment of the present invention, one or more algorithms executed by the machine learning engine 128 are based on not only on key word mapping, but also based on key phrase mapping techniques which work in conjunction with search engines that search for content based on phrases (e.g., groupings of words) instead of individual words. Conventional techniques are limited to key word mapping.

According to an embodiment of the present invention, one or more algorithms executed by the machine learning engine 128 execute volumetric data grouping including capturing large amounts of data (e.g., terabytes and/or gigabytes of data) and deriving the business/product specific sets of the captured data.

In accordance with an embodiment of the present invention, one or more algorithms executed by the machine learning engine 128 process discovered and re-discovered data against an organization's central repository of organization owned data that has been deemed critical for business to define a clear mapping among different navigational or functional key phrases and/or key words that assist with generating CRO magnets. As noted herein, CRO score may depend heavily on effective key phrases and/or key words that lead to desired content. An effective key phrase and/or key word may act like a magnet to the desired content. A magnet link is a hyperlink associated with high-valued (e.g., effective) key phrases and/or key words. The central repository may also be referred to as a link allied corpus.

The one or more algorithms executed by the machine learning engine 128 are configured to use data with consumable and differentiable architectures. For example, different businesses or enterprises have different deliverables and information strategies. Similar to using different formats and styles for the presentation of data, information design and generation methods are also different. The audience for the information can vary based on, for example, technological needs and demographics. The machine learning driven data, in accordance with an embodiment of the present invention, is consumable to accommodate distinct information design and generation methods based on, for example, different technological needs and demographics. The CRO driven key phrase mapping enables defining of accurate data sets for multiple technological needs and demographics.

The one or more algorithms executed by the machine learning engine 128 are configured to repeatedly execute, to derive the users' (e.g., customers') behavior patterns, to replicate the same set of data for every webpage and to provide recommendations for future organization and presentation of information. The one or more algorithms executed by the machine learning engine 128 are further configured to identify information that is in demand and how that information is sought, accessed and/or consumed, and to capture meta data for any click.

In general, machine learning techniques and components used in accordance with embodiment of the present invention may include, but are not necessarily limited to, a Support Vector Machine (SVM), a Multilayer Perceptron (MLP), a deep learning model, decision trees, and clustering.

The analysis and execution layer 120 comprises further hardware and software required for running the learning system platform 105, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

The data layer 130 may comprise a database service, such as, but not necessarily limited to GCE Cloud Storage, Microsoft Azure Blob (Binary Large Object) Storage, DynamoDB, MongoDB, Amazon Aurora and Oracle database. The data layer 130 is populated with data from a plurality of sources. The data populating the data layer 130 includes, but is not necessarily limited to, channel partner data 132, SEO and CRO data 134, a key phrase/key word dictionary 136 and other monitoring data 138 retrieved via the monitoring layer and/or analyzed in the analysis and execution layer 120. The channel partner data 132 includes, for example, data in connection with a variety of CRO factors (e.g., hit maps, clicks, key phrases/key words, path, magnet links, bounce rate, density) regarding whether channel partner websites successfully retrieve sought after content. The SEO and CRO data 134 includes, for example, data in connection with the CRO factors captured by the monitoring layer 110, and CRO and SEO scores, results, analysis and/or recommendation generated by the analysis and execution layer 120 for websites of an organization seeking to improve CRO. The key phrase/key word dictionary 136 includes, for example, a repository of words and/or phrases determined to be often used and/or effective in connection with seeking content. For example, based on frequency of use (e.g. use exceeding a specified threshold) and/or use resulting in successfully retrieving desired content, the key phrase/key word module 114 may identify key phrases and/or key words used by users to find the content, which are ultimately stored in the key phrase/key word dictionary 136. The key phrase/key word dictionary 136 may further include data identifying the frequency with which the key words and/or phrases are used, data identifying corresponding search results associated with the key words and/or phrases, data identifying different combinations of key words and/or phrases that may be used when seeking the same content, and data identifying whether the used key words and/or phrases yield the sought after content and/or websites.

The other monitoring/analytical data 138 includes, for example, additional data captured through the monitoring layer 110 and/or processed in the analysis and execution layer 120, which may be relied on when performing the one or more machine learning algorithms and/or determining customer behavior patterns, defining rules based on how content is sought, accessed and/or used and providing recommendations on how to re-organize or re-present the content.

The data 132, 134, 136 and/or 138 can be mined in real-time from multiple sources over the network(s) 104, so that the information processing system can react to events as they happen. For example, the data may include CRO data captured in real-time by the soft crawler component 111 of the monitoring layer 110. The data 132, 134, 136 and/or 138 can also include previously captured and/or previously analyzed data, which may be relied on in performance of the one or more machine learning algorithms.

Although the data layer 130 in the present embodiment is shown as part of the learning system platform 105, at least a portion of the data layer 130 in other embodiments may be implemented on one or more other processing platforms that are accessible to the learning system platform 105 over one or more networks.

In the FIG. 1 embodiment, the data layer 130 is assumed to comprise one or more storage systems configured to store information relating to processing performed and data used in the monitoring, analysis and execution, and data layers 110, 120 and 130, and relating to other functionality of the learning system platform 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of learning system platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It is assumed that the learning system platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the monitoring, analysis and execution, and data layers 110, 120 and 130 and the elements thereof can each be implemented in the form of one or more LXCs running on one or more VMs. Other arrangements of one or more processing devices of a processing platform can be used to implement the monitoring, analysis and execution, and data layers 110, 120 and 130 as well as other components of the learning system platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the learning system platform 105 to reside in different data centers. Numerous other distributed implementations of the learning system platform 105 are possible.

Accordingly, one or each of the monitoring, analysis and execution, and data layers 110, 120 and 130 can each be implemented in a distributed manner so as to comprise a plurality of distributed components implemented on respective ones of the plurality of compute nodes of the learning system platform 105.

Although illustratively shown as being implemented within the learning system platform 105, components such as monitoring, analysis and execution, and data layers 110, 120 and 130 and the elements thereof in other embodiments can be implemented at least in part externally to the learning system platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as monitoring, analysis and execution, and data layers 110, 120 and 130 and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for the learning system and machine learning services can be offered to cloud infrastructure customers or other users as part of FaaS and/or PaaS offerings.

Figure 2:
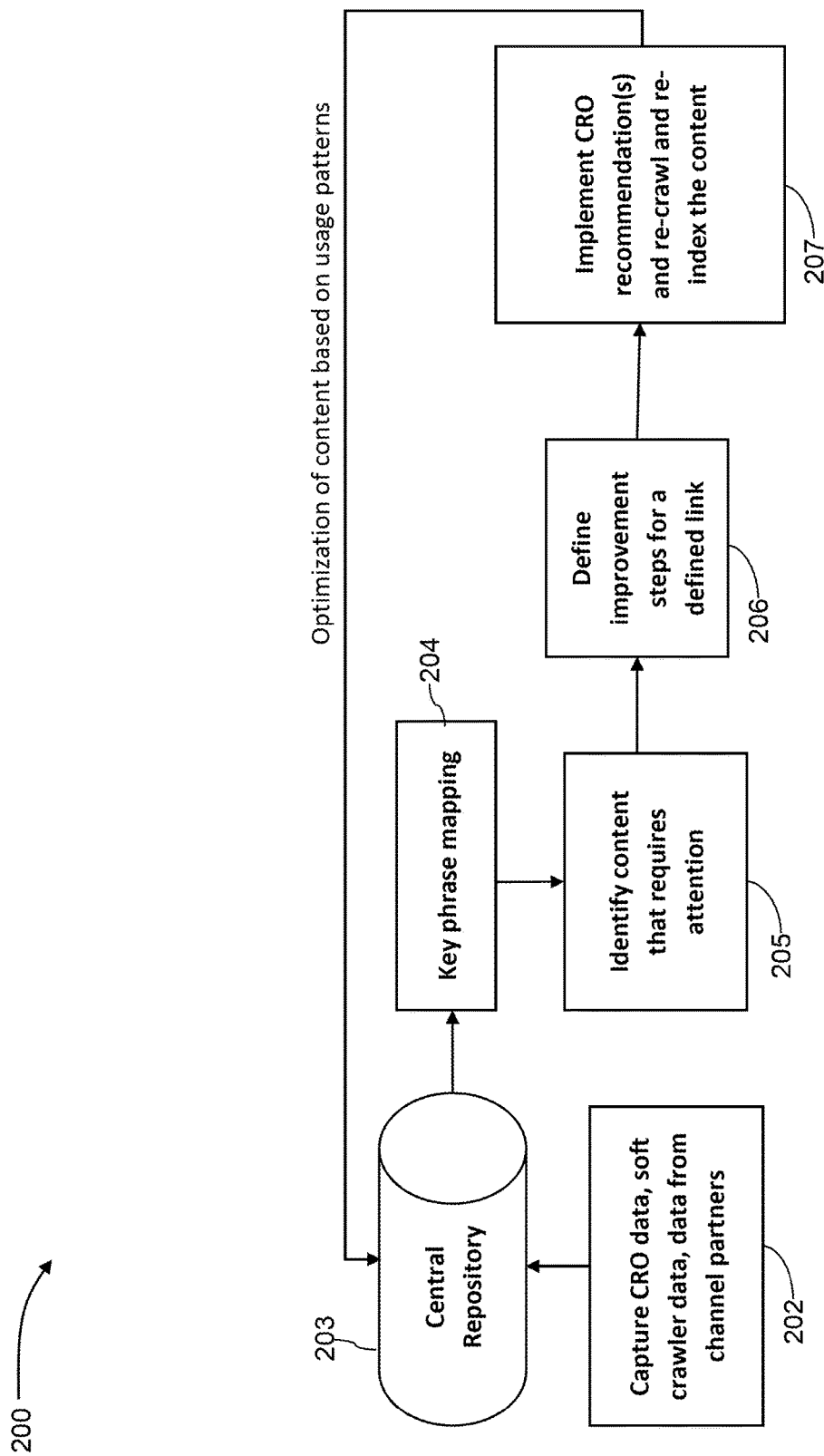
FIG. 2 is a flow diagram of a process for improving conversion rate optimization (CRO) in an illustrative embodiment.

FIG. 2 is a flow diagram of a process for improving CRO in an illustrative embodiment. Referring to FIG. 2, the process 200 as shown includes steps 202 through 207, and is suitable for use in the system 100 but is more generally applicable to other types of information processing systems comprising learning system platforms configured to improve CRO. Referring to FIG. 2, step 202 includes retrieval of CRO data, soft crawler data, and data from channel partners. For example, referring back to FIG. 1, in connection with users/customers seeking content on one or more organizational websites, the monitoring layer 110 captures CRO data, including data corresponding to a variety of CRO factors captured by the soft crawler component 111, and channel partner data. At step 203, the captured data is stored in a central repository (e.g., link allied corpus) of organizational data that is critical for defining key word and/or key phrase mapping for generation of CRO magnets. At step 204 key phrase mapping is performed among different navigational or functional key phrases that assist with generating CRO magnets. Alternatively, a combination of key phrase and key word mapping is performed.

In accordance with an embodiment of the present invention, there are three (3) different types of key phrases, navigational, functional and directional. Based on the nature of a search and the target information, when performing key phrase mapping, the system creates a map between different portions of content against the searched phrase. Once the map is created, the system analyzes which key phrases are correlated with the content portions, and determines whether the key phrases are present in the content headings. If the phrases are present in the content headings, the content is determined to be aligned for CRO. If the phrases are not present in the content headings, the system determines ways to add the key phrases to the content headings.

Following step 204, at step 205, content that requires attention is identified. For example, based on low CRO scores that fail to reach a predetermined threshold and/or low CRO success rates for certain words and/or phrases, the learning system platform 105 identifies problematic content on websites, which requires modifications in the way the content is organized, presented, indexed, etc. The problematic content can be, for example, content that is not being accessed or not being efficiently retrieved. In accordance with an embodiment of the present invention, problematic information and/or content decreases or prevents CRO, and may include irrelevant information that does not contribute to the workflow and/or tasks being accomplished in connection with certain information. In a non-limiting example, too many reference links may dilute content relevance, and adversely impact information exchange among different document sets. Identified problematic information and/or content is removed or modified.

At step 206, steps for improving content presentation, organization and/or indexing in order to result in improved CRO success rates and scores are defined. For example, the recommendation engine 126 provides one or more recommendations for modifying how the content is organized and/or presented in connection with a website. The recommendations can include, but are not necessarily limited to, a mapping strategy for the content to generate maximum conversion rate optimization, optimizing a sitemap of a website, adding one or more key words or key phrases found to have been commonly used to one or more content headings, re-designing the robots.txt file, and re-indexing the content.

In accordance with an embodiment of the present invention, once key phrases are identified, implementation of a mapping strategy can include cross checking content bodies and headings to determine whether the key phrases are present in the content bodies and in the content headings. If the critical phrases are not present in the content bodies or headings, then this is identified as an issue. The identified issue may be transmitted to an organizational user with suggestions for modifying the content bodies and/or headings, and/or the system may execute modifications to the content bodies and/or headings to include the key phrases therein.

"Indexing," as used herein, refers to various methods for organizing the contents of a website, such as, for example, alphabetical indexing, and keyword and/or key phrase and metadata indexing. Re-indexing can be performed for content already published online. In a non-limiting example, there may be existing critical information for an organization online, which is associated with a link already known to customers who may have, for example, bookmarked the link. Without changing the link to the content, the content can be updated by, for example, applying CRO algorithms. In this case, the content is re-indexed by replacing the on page information, while maintaining the same link, which leads to the current and updated content.

Optimizing the sitemap may include, for example, changing the organization of user-visible sitemaps which are used to assist visitors with finding specific pages, and may be used by crawlers. XML sitemaps, which list the pages in a site, their relative importance, and how often they are updated, may be modified to improve CRO. In connection with re-designing the robots.txt file, modifications can be made with respect to how websites communicate with web crawlers and other web robots. For example, modifications may be made based altering directives to web crawlers regarding which areas of the website are to be processed or scanned, and which areas are to be ignored. In general, web crawlers, also referred to as spiders, include Internet bots that systematically browse the World Wide Web, in order to perform web indexing. Search engines may use web crawling software to update their web content or indices of others sites' web content.

At step 207, the CRO recommendations are implemented, and the content is re-indexed and re-crawled. For example, based on the recommendations, the content is reorganized and re-presented in order to increase CRO of the content. As noted, the content can be mapped differently, key phrases and/or key words can be added to content headings, and the content can be re-indexed. The system further performs re-crawling of the content, using, for example, the soft crawler component to capture data on the results of the implementation of the recommendations, and to determine whether the recommendations were effective in achieving increased CRO. As noted in FIG. 2, the content is optimized based on usage patterns (e.g., determined by the pattern derivation engine 122), and the optimized configurations are provided to the central repository 203 for subsequent use when defining key word and/or key phrase mapping for generation of CRO magnets.

Figure 3:
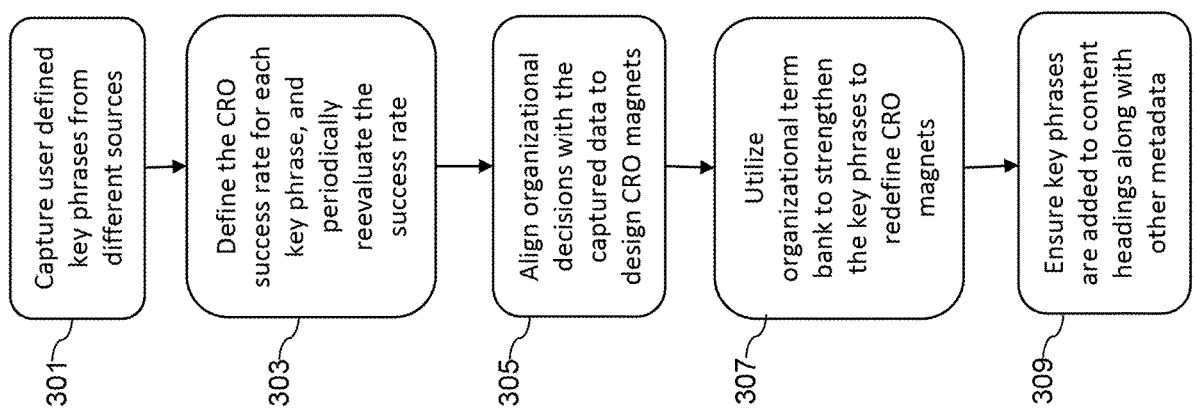
FIG. 3 is a flow diagram of a process for improving conversion rate optimization (CRO) in an illustrative embodiment.

FIG. 3 is a flow diagram of a process for improving CRO in an illustrative embodiment. Referring to FIG. 3, the process 300 as shown includes steps 301 through 309, and is suitable for use in the system 100 but is more generally applicable to other types of information processing systems comprising learning system platforms configured to improve CRO. In step 301, user defined key phrases are captured from different sources. For example, using the monitoring layer 110, key phrases that have been used by customers in connection with seeking content, for example, in search engines through interfacing customer devices 102, are captured. In addition, key phrases that have been used by customers in connection with seeking content through channel partner websites can also be captured.

In step 303, CRO success rate is defined for each key phrase, and the success rate is periodically reevaluated as content is reorganized, re-presented and/or re-indexed. For example, the system determines whether the used key words and/or phrases lead to users accessing and/or consuming the sought after content.

In step 305, organizational decisions are aligned with the captured data to design CRO magnets. For example, effective key phrases that act like magnets to the desired content are used to design hyperlinks associated with high-valued (e.g., effective) key phrases (e.g., "magnet links"), which are validated against organizational information to understand if the magnet links are relevant to the organization.

In step 307, an organization's term bank (e.g., central repository) is used to strengthen the key phrases to redefine CRO magnets. For example, an organization's central repository may include organizational data, such as, for example, product or service descriptions and/or nomenclature that is critical for defining key phrases for generation of CRO magnets. This information can be used to tailor the key phrases to more closely relate to the organization, and enable the creations of magnet links which allow users to more efficiently find and access the organizational content. In step 309, the key phrases are added to content headings along with other metadata, so that when the key phrases are used to search for content, search engines parsing through the content headings are able to retrieve the correct content that is related to the key phrases. While the embodiment described in connection with FIG. 3 identifies key phrases, embodiments of the present invention can also apply to key words and combinations of key words and key phrases.

The operation of the information processing system 100 will now be described in further detail with reference to the flow diagram of FIG. 4. The process 400 as shown includes steps 401 through 411, and is suitable for use in the system 100 but is more generally applicable to other types of information processing systems comprising learning system platforms configured to improve CRO.

In step 401, the interaction of a plurality of users with at least one website is monitored, and in step 403 data from the monitoring is extracted and analyzed. The data corresponds to the interaction of the plurality of users with the at least one website, and can include, but is not necessarily limited to, a hit map for the at least one website, click counts corresponding to respective portions of the content, an indication of one or more search engines that have indexed the content, and one or more navigation paths of the plurality of users in connection with seeking, accessing and/or using the content. The data can also include, but is not necessarily limited to, one or more key words or key phrases used by the plurality of users in connection with seeking the content, channel partner performance in connection with one or more conversion rate optimization factors, and a percentage of the plurality of users who navigate away from the at least one website after viewing one webpage of the at least one website.

In step 405, the process 400 further comprises deriving one or more patterns of the plurality of users based on the analyzing. In step 407, one or more rules regarding how content from the at least one website is sought, accessed and/or used are generated. Referring to step 409, one or more recommendations for modifying how the content is organized and/or presented in connection with the at least one website are generated and transmitted to at least one organizational user device. The one or more recommendations may comprise, but are not necessarily limited to, a mapping strategy for the content to generate maximum conversion rate optimization.

The process 400 further includes, at step 411, that reorganization and/or re-presentation of the content be executed in connection with the at least one website. The reorganization and/or the re-presentation of the content includes, but is not necessarily limited to, adding one or more key words or key phrases used by the plurality of users in connection with seeking the content to one or more content headings, and/or re-indexing the content.

The deriving, the generation of the one or more rules and the generation of the one or more recommendations can be performed by invoking one or more machine learning algorithms using the data. For example, the learning system platform 105 invokes one or more machine learning algorithms to identify usage patterns and rules, and generate recommendations for modifying how content is presented and organized in order to improve CRO. For example, in accordance with an embodiment of the present invention, a machine learning algorithm comprises a regression model which starts with an initial data corpus and creates a key phrase dictionary based on the initial data corpus. The key phrase dictionary includes, for example, a database repository of phrases determined to be often used and/or effective in connection with seeking content.

Scores are generated for each of the key phrases based on their occurrence in connection with seeking the content. The algorithm corresponds the scores with the key phrases and creates a column in the database repository with the corresponding scores for the occurrences of the key phrases. The algorithm then calculates the initial SEO score (S(i)) for one or more websites, and maps S(i) to an initial CRO score (CRO(0)) for one or more websites, setting CRO to an initial value. The algorithm further maps the initial SEO score (S(i)) and the initial CRO score (CRO(0)) to probabilities of the key phrases contributing to the SEO and CRO scores (key phrase probability density) for the one or more websites. The mapping of the initial SEO and CRO scores to the probabilities of the key phrases contributing to the SEO and CRO scores is performed using probability density function (PDF) techniques.

In accordance with an embodiment of the present invention, the algorithm further sets the CRO score for the at least one website as a lower threshold value at one or more times t (CRO(min, t), collects data from different data sources, and calculates SEO and CRO scores for the at least one website at one or more of the times t (S(t) and CRO(t)).

The algorithm generates a variance map between S(t) and CRO(t), and creates a linear regression model between the SEO and CRO scores for one or more websites. If CRO (min) for a particular time t is breached, the algorithm will reset its parameters for data collection. As long as the CRO(t)>CRO(min), the algorithm will continue to execute and adjust the score values for the key phrase occurrences in the key phrase dictionary.

The linear regression model works to improve the probabilities of the key phrases contributing to SEO and CRO scores (key phrase probability density) by calculating a Kernel density estimate (KDE) for the key phrases. Kernel density estimation techniques are used for estimating a frequency of a given value given a random sample.

The algorithm continuously monitors and attempts to align key phrase probability density scores (the probabilities of the one or more key words or key phrases contributing to SEO and CRO scores) so that the CRO score for one or more websites at one or more of the times t is greater than the corresponding lower threshold value (CRO(t)>CRO(min)), and so that SEO and CRO scores (SEO(t) and CRO(t)) maintain positive trend relations over a given time period. While the operation of the algorithm is described in connection with key phrases, embodiments of the present invention can also apply the algorithm to key words and combinations of key words and key phrases.

Figure 4:
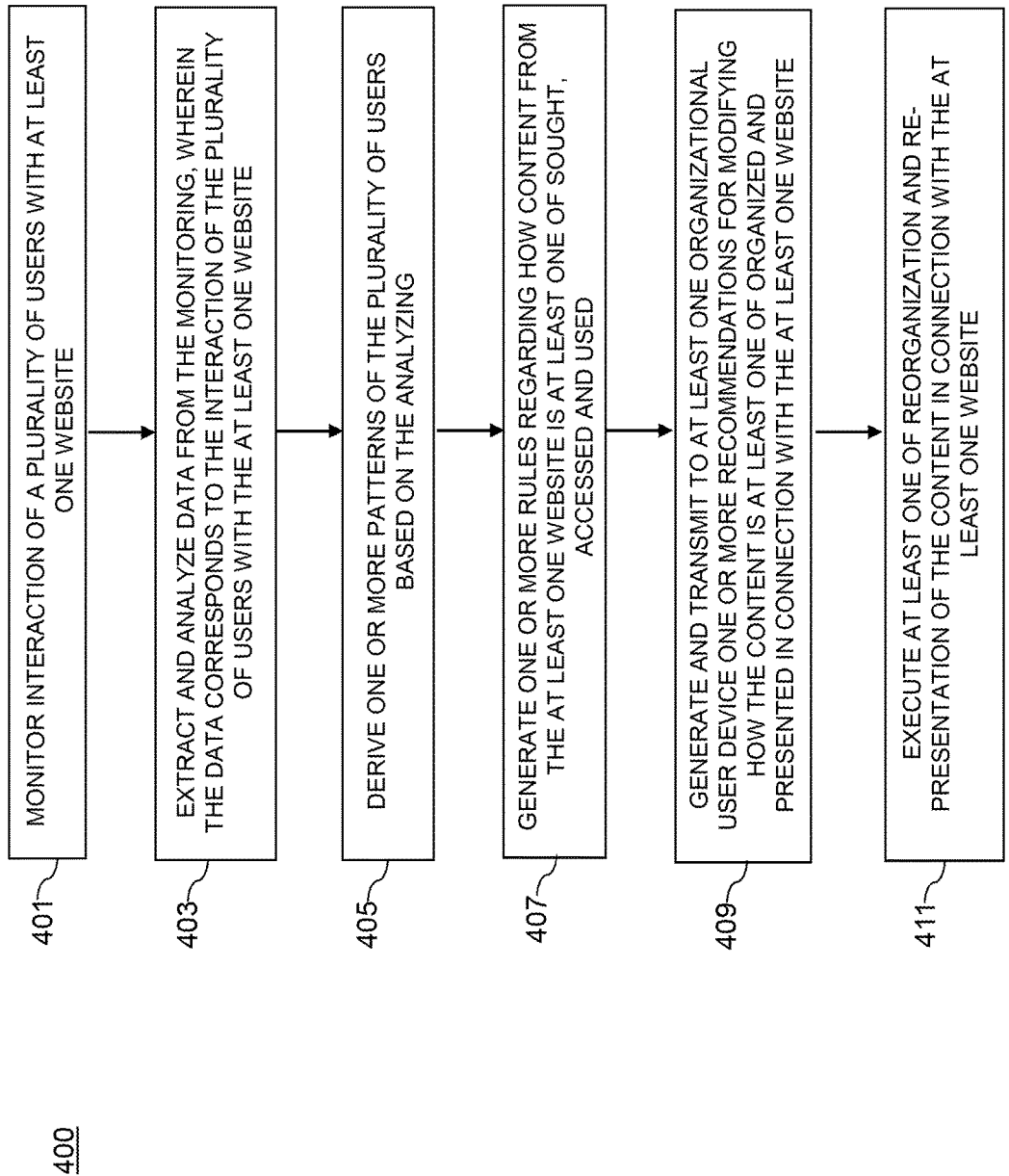
FIG. 4 is a flow diagram of a process for improving conversion rate optimization (CRO) in an illustrative embodiment.

It is to be appreciated that the FIG. 4 process and other features and functionality described above can be adapted for use with other types of information systems configured to execute learning system services on a learning system platform or other type of processing platform.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a learning system platform as disclosed herein can provide a number of significant advantages relative to conventional arrangements. For example, embodiments of the present invention are configured to allow improved CRO by increasing the click through rate (CTR), which is the number of users who click on a link with respect to the number of total users who view a webpage or other medium including the link.

By identifying effective key phrases and/or key words and organizing and present content based on the identified key phrases and/or key words, embodiments of the present invention advantageously ensure that content is accurate for the search engines and generate more trustworthy information for users. Content with improved CRO is favorable for search engines, and embodiments of the present invention enhance SEO initiatives by adding an additional layer for content accuracy.

The proposed machine learning algorithm in accordance with the embodiments of the present invention is advantageously compatible with search algorithms for major search engines. By introducing re-indexing and re-crawling, the algorithm generates magnets for the search engines, which improves CRO.

Embodiments of the present invention advantageously provide adaptable techniques that can be customized based on the need to improve CRO, without impacting existing SEO practice, and that can improve CRO affinity through organizational SEO triggers.

Embodiments of the present invention utilize a learning system platform that is configured to measure SEO adherence of any content that is getting published online, and suggest the best possible mapping strategies to amplify the content to generate maximum CRO.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the learning system platform 105 or portions thereof are illustratively implemented for use by tenants of such a multi-tenant environment.

As mentioned previously, cloud infrastructure as disclosed herein can include cloud-based systems such as AWS, GCE and Windows Azure. Virtual machines provided in such systems can be used to implement at least portions of one or more of a computer system and a content addressable storage system in illustrative embodiments. These and other cloud-based systems in illustrative embodiments can include object stores such as AWS S3, GCE Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing learning system of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
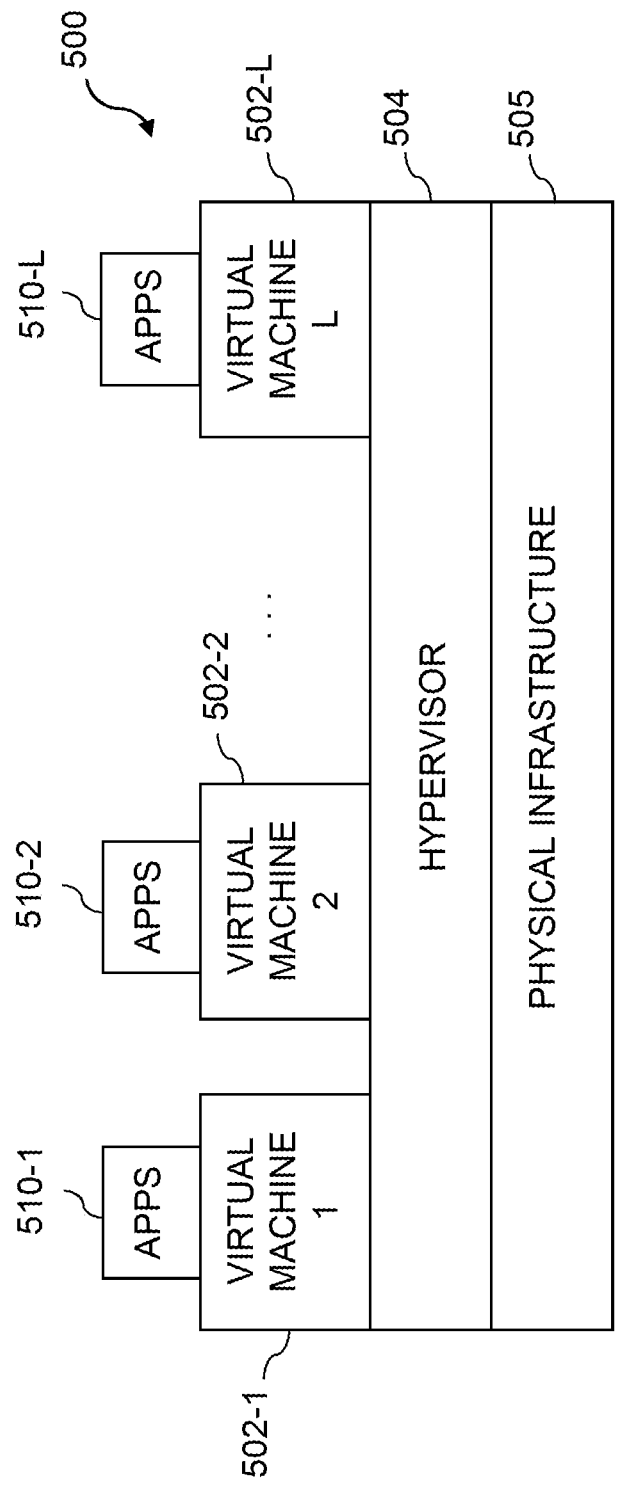
FIGS. 5 and 6 show examples of processing platforms that may be utilized to implement at least a portion of an information processing system in illustrative embodiments.
Figure 6:
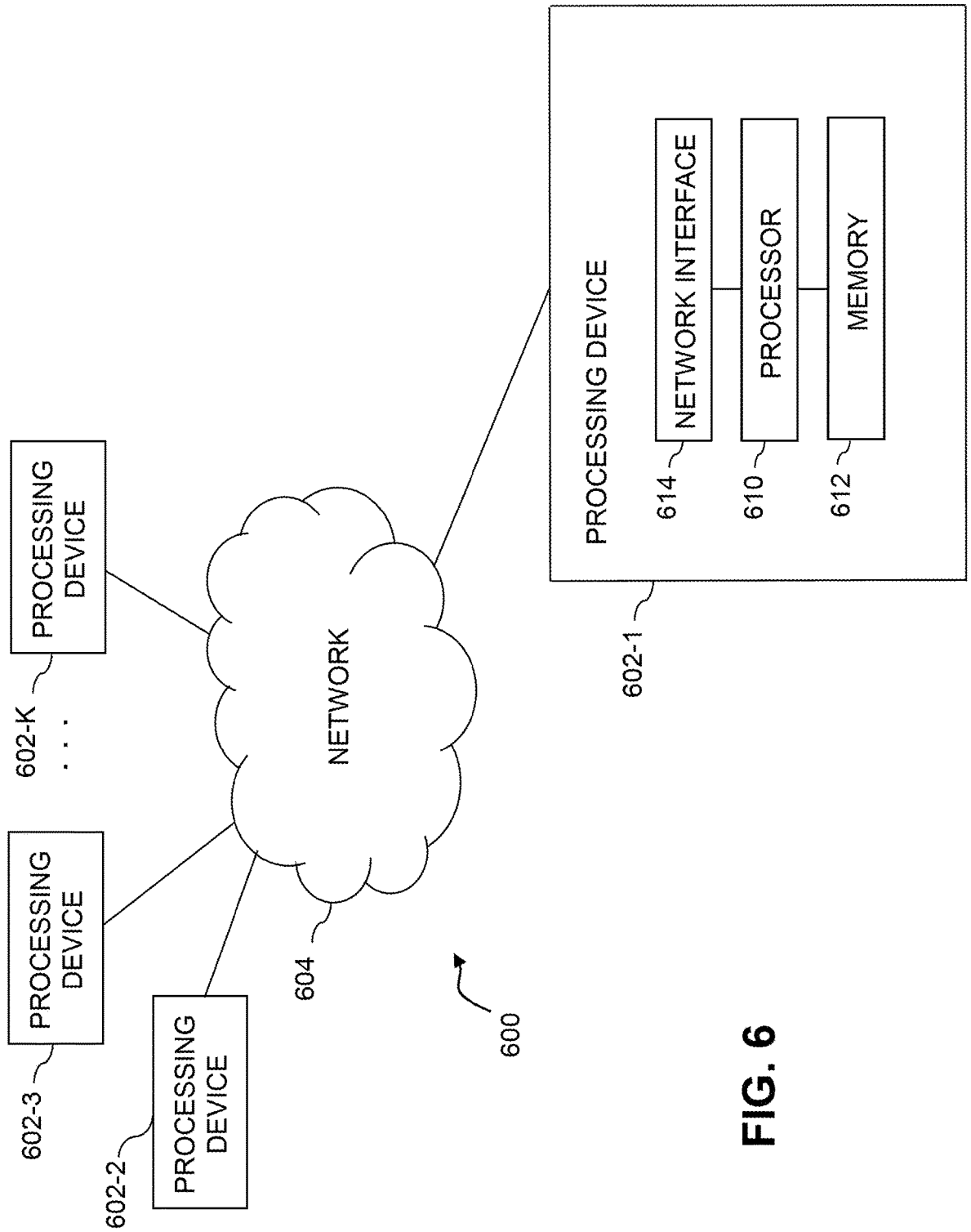

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the learning system platform 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and learning system platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing platform comprising at least one processor coupled to at least one memory;
    said at least one processing platform, when executing program code, being configured to:
    monitor interaction of a plurality of users with at least one website;
    extract and analyze data from the monitoring, wherein the data corresponds to the interaction of the plurality of users with the at least one website;
    derive one or more patterns of the plurality of users based on the analyzing;
    generate one or more rules regarding how content from the at least one website is at least one of sought, accessed and used;
    generate and transmit to at least one organizational user device one or more recommendations for modifying how the content is at least one of organized and presented in connection with the at least one website; and
    execute at least one of reorganization and re-presentation of the content in connection with the at least one website;
    wherein at least one of the deriving, the generation of the one or more rules and the generation of the one or more recommendations is performed by invoking one or more machine learning algorithms using the data;
    wherein the data comprises one or more key words or key phrases used by the plurality of users in connection with seeking the content; and
    wherein in executing at least one of the reorganization and the re-presentation of the content in connection with the at least one website, said at least one processing platform is configured to:
    define one or more hyperlinks to at least a portion of the content, wherein the one or more hyperlinks comprise at least a portion of the one or more key words or key phrases;
    access a repository including organizational nomenclature related to the content;
    modify the one or more hyperlinks to include at least a portion of the organizational nomenclature; and
    add at least the portion of the one or more key words or key phrases and at least the portion of the organizational nomenclature to one or more content headings.

2. The apparatus of claim 1 wherein the data comprises at least one of a hit map for the at least one website and click counts corresponding to respective portions of the content.

3. The apparatus of claim 1 wherein the data comprises an indication of one or more search engines that have indexed the content.

4. The apparatus of claim 1 wherein the data comprises one or more navigation paths of the plurality of users in connection with at least one of seeking, accessing and using the content.

5. The apparatus of claim 1 wherein in invoking the one or more machine learning algorithms, said at least one processing platform is configured to compile the one or more key words or key phrases and generate scores for each of the one or more key words or key phrases based on their occurrence in connection with seeking the content.

6. The apparatus of claim 5 wherein in invoking the one or more machine learning algorithms, said at least one processing platform is configured to calculate an initial search engine optimization score for the at least one website, and map the initial search engine optimization score to an initial conversion rate optimization score for the at least one website.

7. The apparatus of claim 6 wherein in invoking the one or more machine learning algorithms, said at least one processing platform is configured to map the initial search engine optimization and the initial conversion rate optimization scores to probabilities of the one or more key words or key phrases contributing to search engine optimization and conversion rate optimization scores for the at least one website.

8. The apparatus of claim 7 wherein in invoking the one or more machine learning algorithms, said at least one processing platform is configured to set as a lower threshold value, the conversion rate optimization score for the at least one website at one or more times t, and calculate a conversion rate optimization score for the at least one website at one or more of the times t.

9. The apparatus of claim 8 wherein in invoking the one or more machine learning algorithms, said at least one processing platform is configured to:
    calculate a search engine optimization score for the at least one website at one or more of the times t; and
    create a linear regression model between the search engine optimization and conversion rate optimization scores for the at least one website.

10. The apparatus of claim 9 wherein in invoking the one or more machine learning algorithms, said at least one processing platform is configured to utilize the linear regression model to improve the probabilities of the one or more key words or key phrases contributing to search engine optimization and conversion rate optimization scores by calculating a Kernel density estimate for the one or more key words or key phrases.

11. The apparatus of claim 10 wherein in invoking the one or more machine learning algorithms, said at least one processing platform is configured to continuously monitor and align the probabilities of the one or more key words or key phrases contributing to search engine optimization and conversion rate optimization scores so that the conversion rate optimization score for the at least one website at one or more of the times t is greater than the corresponding lower threshold value.

12. The apparatus of claim 11 wherein in invoking the one or more machine learning algorithms, said at least one processing platform is configured to continuously monitor and align the probabilities of the one or more key words or key phrases contributing to search engine optimization and conversion rate optimization scores so that the search engine optimization and conversion rate optimization scores maintain positive trend relations over a given time period.

13. The apparatus of claim 1 wherein the data comprises channel partner performance in connection with one or more conversion rate optimization factors.

14. The apparatus of claim 1 wherein the data comprises a percentage of the plurality of users who navigate away from the at least one website after viewing one webpage of the at least one website.

15. The apparatus of claim 1 wherein the one or more recommendations comprise a mapping strategy for mapping the one or more key words or key phrases to at least one of the content and the one or more content headings to generate maximum conversion rate optimization.

16. The apparatus of claim 1 wherein in executing at least one of the reorganization and the re-presentation of the content in connection with the at least one website, said at least one processing platform is configured to re-index the content.

17. A method comprising:
monitoring interaction of a plurality of users with at least one website;
extracting and analyzing data from the monitoring, wherein the data corresponds to the interaction of the plurality of users with the at least one website;
deriving one or more patterns of the plurality of users based on the analyzing, wherein the deriving is performed by invoking one or more machine learning algorithms using the data;
generating one or more rules regarding how content from the at least one website is at least one of sought, accessed and used;
generating and transmitting to at least one organizational user device one or more recommendations for modifying how the content is at least one of organized and presented in connection with the at least one website; and
executing at least one of reorganization and re-presentation of the content in connection with the at least one website;
wherein at least one of the deriving, the generating of the one or more rules and the generating of the one or more recommendations is performed by invoking one or more machine learning algorithms using the data;
wherein the data comprises one or more key words or key phrases used by the plurality of users in connection with seeking the content; and
wherein executing at least one of the reorganization and the re-presentation of the content in connection with the at least one website comprises:
defining one or more hyperlinks to at least a portion of the content, wherein the one or more hyperlinks comprise at least a portion of the one or more key words or key phrases;
accessing a repository including organizational nomenclature related to the content;
modifying the one or more hyperlinks to include at least a portion of the organizational nomenclature; and
adding at least the portion of the one or more key words or key phrases and at least the portion of the organizational nomenclature to one or more content headings and
wherein the method is performed by at least one processing platform comprising at least one processing device comprising a processor coupled to a memory.

18. The method of claim 17, wherein invoking the one or more machine learning algorithms comprises compiling the one or more key words or key phrases and generating scores for each of the one or more key words or key phrases based on their occurrence in connection with seeking the content.

19. A computer program product comprising a non-transitory processor-readable storage medium having stored therein program code of one or more software programs, wherein the program code when executed by at least one processing platform causes said at least one processing platform to:
monitor interaction of a plurality of users with at least one website;
extract and analyze data from the monitoring, wherein the data corresponds to the interaction of the plurality of users with the at least one website;
derive one or more patterns of the plurality of users based on the analyzing, wherein the deriving is performed by invoking one or more machine learning algorithms using the data;
generate one or more rules regarding how content from the at least one website is at least one of sought, accessed and used;
generate and transmit to at least one organizational user device one or more recommendations for modifying how the content is at least one of organized and presented in connection with the at least one website; and
execute at least one of reorganization and re-presentation of the content in connection with the at least one website;
wherein at least one of the deriving, the generation of the one or more rules and the generation of the one or more recommendations is performed by invoking one or more machine learning algorithms using the data;
wherein the data comprises one or more key words or key phrases used by the plurality of users in connection with seeking the content; and
wherein in executing at least one of the reorganization and the re-presentation of the content in connection with the at least one website, the program code causes said at least one processing platform to:
define one or more hyperlinks to at least a portion of the content, wherein the one or more hyperlinks comprise at least a portion of the one or more key words or key phrases;
access a repository including organizational nomenclature related to the content;
modify the one or more hyperlinks to include at least a portion of the organizational nomenclature; and
add at least the portion of the one or more key words or key phrases and at least the portion of the organizational nomenclature to one or more content headings.

20. The computer program product of claim 19, wherein in invoking the one or more machine learning algorithms, the program code causes said at least one processing platform to compile the one or more key words or key phrases and generate scores for each of the one or more key words or key phrases based on their occurrence in connection with seeking the content.

* * * * *